United States Patent
Koller et al.

(10) Patent No.: US 9,992,326 B1
(45) Date of Patent: Jun. 5, 2018

(54) OUT OF THE BOX EXPERIENCE (OOBE) COUNTRY CHOICE USING WI-FI LAYER TRANSMISSION

(71) Applicant: Sprint Communications Company L.P., Overland Park, KS (US)

(72) Inventors: Gary D. Koller, Overland Park, KS (US); Mark Douglas Peden, Olathe, KS (US); Raymond E. Reeves, Oviedo, FL (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 237 days.

(21) Appl. No.: 14/530,666

(22) Filed: Oct. 31, 2014

(51) Int. Cl.
*H04M 1/725* (2006.01)
*H04W 4/02* (2018.01)
*H04W 64/00* (2009.01)
*H04W 60/00* (2009.01)

(52) U.S. Cl.
CPC ......... *H04M 1/72572* (2013.01); *H04W 4/02* (2013.01); *H04W 60/00* (2013.01); *H04W 64/00* (2013.01)

(58) Field of Classification Search
CPC ... H04M 1/72572; H04W 4/02; H04W 60/00; H04W 64/00
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 6,889,040 B1 | 5/2005 | Koo et al. | |
| 7,027,773 B1 | 4/2006 | McMillin | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,530,079 B2 | 5/2009 | Stubbs et al. | |
| 7,817,988 B2 | 10/2010 | Kruis et al. | |
| 7,904,895 B1 | 3/2011 | Cassapakis et al. | |
| 7,991,988 B2 | 8/2011 | Chen | |

(Continued)

FOREIGN PATENT DOCUMENTS

DE 112016000711 T5 11/2017
EP 2079256 A1 7/2009

(Continued)

OTHER PUBLICATIONS

Masterson, Michelle E., et al., "System and Methods for Deferred and Remote Device Branding", filed Jul. 16, 2014, International Serial No. PCT/US14/46773.

(Continued)

*Primary Examiner* — Lester Kincaid
*Assistant Examiner* — William Wang

(57) ABSTRACT

Embodiments of the disclosure are directed to methods and systems for determining the language presented by a mobile communication device operable for use in a plurality of different countries during an activation process on the mobile communication device. Methods may comprise receiving information from beacon(s) of one or more wireless access points to determine the presented language.

17 Claims, 9 Drawing Sheets

(56) References Cited

U.S. PATENT DOCUMENTS

| | | |
|---|---|---|
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,522,343 B2 | 8/2013 | Hernacki |
| 8,571,536 B2 | 10/2013 | Urbanek |
| 8,612,967 B1 | 12/2013 | Delker |
| 8,626,165 B1 | 1/2014 | Narasimhan et al. |
| 8,639,245 B2 | 1/2014 | Shi et al. |
| 8,666,383 B1 | 3/2014 | Mauer et al. |
| 8,699,377 B2 | 4/2014 | Veillette |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,211 B2 | 12/2014 | Huq et al. |
| 8,909,291 B1 | 12/2014 | Spanel et al. |
| 8,938,436 B2 | 1/2015 | Kozempel |
| 8,965,366 B1 | 2/2015 | Somayajula et al. |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,124,719 B1 | 9/2015 | Inlow et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,304,668 B2 | 4/2016 | Rezende et al. |
| 9,307,400 B1 | 4/2016 | Blinn et al. |
| 9,313,643 B1 | 4/2016 | Ghoshal et al. |
| 9,319,270 B2 | 4/2016 | Bestmann et al. |
| 9,357,378 B1 | 5/2016 | Delker et al. |
| 9,363,622 B1 | 6/2016 | Ahn et al. |
| 9,392,395 B1 | 7/2016 | Indurkar |
| 9,398,462 B1 | 7/2016 | Delker et al. |
| 9,420,399 B2 | 8/2016 | Urbanek |
| 9,420,496 B1 | 8/2016 | Indurkar |
| 9,426,641 B1 | 8/2016 | Ghoshal et al. |
| 9,439,025 B1 | 9/2016 | Ghoshal et al. |
| 9,451,446 B2 | 9/2016 | Spanel et al. |
| 9,532,211 B1 | 12/2016 | Sumner |
| 9,549,009 B1 | 1/2017 | Annan et al. |
| 9,603,009 B1 | 3/2017 | Indurkar |
| 9,681,251 B1 | 6/2017 | Ahn et al. |
| 9,743,271 B2 | 8/2017 | Urbanek |
| 9,794,727 B1 | 10/2017 | Delker et al. |
| 9,913,132 B1 | 3/2018 | Ghoshal et al. |
| 2002/0091931 A1 | 7/2002 | Quick, Jr. et al. |
| 2002/0142783 A1* | 10/2002 | Yoldi .............. G01S 19/258 455/456.1 |
| 2003/0023514 A1 | 1/2003 | Adler et al. |
| 2003/0031235 A1 | 2/2003 | Kim et al. |
| 2003/0188160 A1 | 10/2003 | Sunder et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0254975 A1 | 12/2004 | Teh et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0114114 A1* | 5/2005 | Rudolph ............ G06F 17/2735 704/10 |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2005/0203703 A1* | 9/2005 | Chang .................... G01S 19/52 701/479 |
| 2006/0025151 A1 | 2/2006 | Karaoguz et al. |
| 2006/0121894 A1 | 6/2006 | Ganesan |
| 2006/0126620 A1 | 6/2006 | Bonar et al. |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0242150 A1 | 10/2006 | Jogand-Coulomb et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0043667 A1 | 2/2007 | Qawami et al. |
| 2007/0082655 A1 | 4/2007 | Link, II et al. |
| 2007/0099599 A1 | 5/2007 | Smith et al. |
| 2007/0129057 A1 | 6/2007 | Xu et al. |
| 2007/0130156 A1 | 6/2007 | U Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0192854 A1 | 8/2007 | Kelley et al. |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0022395 A1 | 1/2008 | Holtzman et al. |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0051076 A1 | 2/2008 | OShaughnessy et al. |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0188210 A1* | 8/2008 | Choi .................... G04G 9/0076 455/414.3 |
| 2008/0225806 A1 | 9/2008 | Arian et al. |
| 2008/0281511 A1 | 11/2008 | Miyata |
| 2008/0298559 A1* | 12/2008 | Nanjundaswamy ...................... H04M 1/72572 379/88.16 |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0217385 A1 | 8/2009 | Teow et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |

(56) References Cited

U.S. PATENT DOCUMENTS

| | | |
|---|---|---|
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0138652 A1 | 6/2010 | Sela et al. |
| 2010/0159876 A1 | 6/2010 | Brown et al. |
| 2010/0159954 A1* | 6/2010 | Rahman .................. H04W 4/02 455/456.3 |
| 2010/0161724 A1 | 6/2010 | Sathyan et al. |
| 2010/0161928 A1 | 6/2010 | Sela et al. |
| 2010/0167696 A1 | 7/2010 | Smith et al. |
| 2010/0185434 A1* | 7/2010 | Burvall ................. G06F 17/289 704/3 |
| 2010/0190479 A1* | 7/2010 | Scott ..................... G06F 17/289 455/414.1 |
| 2010/0192120 A1 | 7/2010 | Raleigh |
| 2010/0194632 A1* | 8/2010 | Raento .............. H04M 1/72572 342/357.25 |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0250368 A1 | 9/2010 | Porco |
| 2010/0262638 A1 | 10/2010 | Fitzgerald |
| 2010/0291898 A1 | 11/2010 | Sanding et al. |
| 2010/0311391 A1 | 12/2010 | Siu et al. |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0086611 A1 | 4/2011 | Klein et al. |
| 2011/0119716 A1 | 5/2011 | Coleman, Sr. |
| 2011/0136482 A1 | 6/2011 | Kaliner |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202233 A1* | 8/2011 | Hatton .................... H04W 4/02 701/36 |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0030512 A1 | 2/2012 | Wadhwa et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054022 A1 | 3/2012 | Kosashvili |
| 2012/0077546 A1 | 3/2012 | Kawa et al. |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0142314 A1 | 6/2012 | Mohammed |
| 2012/0151199 A1 | 6/2012 | Shriver |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2012/0309377 A1* | 12/2012 | De Atley .............. H04W 8/245 455/418 |
| 2013/0010641 A1 | 1/2013 | Dinan |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0031541 A1 | 1/2013 | Wilks et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0124186 A1* | 5/2013 | Donabedian .......... G06F 17/289 704/2 |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0275560 A1 | 10/2013 | Bestmann et al. |
| 2013/0281085 A1* | 10/2013 | Sen ....................... H04W 48/18 455/426.1 |
| 2013/0295902 A1 | 11/2013 | Justen et al. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2013/0326359 A1 | 12/2013 | Beckert et al. |
| 2014/0024332 A1* | 1/2014 | Droste ................ H04L 12/1895 455/404.2 |
| 2014/0045483 A1 | 2/2014 | Whidden |
| 2014/0068779 A1 | 3/2014 | Tan et al. |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0033291 A1 | 1/2015 | Nicolau |
| 2015/0040246 A1 | 2/2015 | Yuen et al. |
| 2015/0065105 A1 | 3/2015 | Masterson et al. |
| 2015/0071268 A1* | 3/2015 | Kennedy .................. H04W 8/08 370/338 |
| 2015/0094041 A1 | 4/2015 | Jung et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0220245 A1 | 8/2015 | Wojcik et al. |
| 2015/0242336 A1 | 8/2015 | Loreskar et al. |
| 2015/0271662 A1 | 9/2015 | Lhamon et al. |
| 2015/0304506 A1 | 10/2015 | Zhu et al. |
| 2015/0312873 A1 | 10/2015 | Cormier et al. |
| 2015/0319178 A1 | 11/2015 | Desai et al. |
| 2015/0331590 A1 | 11/2015 | Yasui |

(56) References Cited

U.S. PATENT DOCUMENTS

| | | |
|---|---|---|
| 2015/0370428 A1 | 12/2015 | Chan et al. |
| 2016/0029204 A1 | 1/2016 | Lalwaney |
| 2016/0044091 A1 | 2/2016 | Doumet |
| 2016/0094931 A1 | 3/2016 | Urbanek |
| 2016/0105843 A1* | 4/2016 | Xue .................... H04W 48/18 455/426.1 |
| 2016/0234675 A1 | 8/2016 | Ghoshal et al. |
| 2016/0239317 A1 | 8/2016 | Cuddihy et al. |
| 2016/0255493 A1 | 9/2016 | Lihosit et al. |
| 2017/0150435 A1 | 5/2017 | Tagg et al. |
| 2017/0295450 A1 | 10/2017 | Urbanek |

FOREIGN PATENT DOCUMENTS

| | | |
|---|---|---|
| EP | 2461613 A1 | 6/2012 |
| GB | 2292047 A | 2/1996 |
| JP | 201285272 A | 4/2012 |
| JP | 2015505190 A | 2/2015 |
| JP | 5924347 B2 | 4/2015 |
| JP | 6270066 B2 | 1/2018 |
| JP | 6273585 B2 | 1/2018 |
| JP | 6277455 B2 | 1/2018 |
| KR | 2006039974 A | 5/2006 |
| WO | WO2010135257 A1 | 11/2010 |
| WO | 2012078753 A1 | 6/2012 |
| WO | 2013169983 A1 | 11/2013 |
| WO | WO2014020237 A1 | 2/2014 |
| WO | 2014046814 A1 | 3/2014 |
| WO | 2014113128 A1 | 7/2014 |
| WO | 2014123758 A1 | 8/2014 |
| WO | 2014123759 A1 | 8/2014 |
| WO | 2014158430 A1 | 10/2014 |
| WO | WO2015030945 A1 | 3/2015 |
| WO | WO2015060965 A2 | 4/2015 |
| WO | WO2016130266 A1 | 8/2016 |

OTHER PUBLICATIONS

Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipment Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Indurkar, Dhananjay, "Activation Sequence Using Permission Based Connection to Network", filed Jan. 24, 2014, U.S. Appl. No. 14/163,041.
Ahn, Chul Jin, et al., "Customization for Preloaded Applications", filed Mar. 31, 2014, U.S. Appl. No. 14/231,718.
Blinn, Benjamin P., et al. "System and Method of Efficient Mobile Device Network Brand Customization," filed Sep. 2, 2014, U.S. Appl. No. 14/475,399.
Institute of Electrical and Electronics Engineers, Inc. (IEEE, Inc.), "Part 11: Wireless LAN Medium Access Control (MAC) and Physical Layer (PHY) specification," IEEE, Inc. Jul. 13, 2001, pp. 9-34, IEEE Std 802.11d-2001, New York City, NY, USA.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
EP Search Report dated Jul. 7, 2016, European Application Serial No. 13871478.7 filed on Jan. 18, 2013.
EP Search Report dated Aug. 24, 2015, European Application Serial No. 14749462.9, filed on Feb. 8, 2013.
Notice of Allowance dated Sep. 12, 2016, U.S. Appl. No. 13/763,443, filed Feb. 8, 2013.
Notice of Allowance dated Aug. 18, 2016, U.S. Appl. No. 13/968,259, filed Aug. 15, 2013.
Office Action dated Oct. 6, 2016, U.S. Appl. No. 14/231,718, filed Mar. 31, 2014.
YOTA Devices, "Hands-on with the YotaPhone: the e-ink Android phone that nobody expected," New York Times, 2010.
Ghoshal, Jagannath, et al., "System and Method of Mobile Phone Customization Based on Universal Manifest with Feature Override," filed Sep. 16, 2016, U.S. Appl. No. 15/268,347.
Ghoshal, Jagannath, et al., "System and Method of Mobile Phone Customization Based on Universal Manifest," filed Sep. 14, 2016, U.S. Appl. No. 15/265,833.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
First Action Interview Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
First Action Interview Pre-Interview Communication dated Sep. 22, 2014, U.S. Appl. No. 13/468,028, filed May 9, 2013.
First Action Interview Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
First Action Interview Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.

(56) References Cited

OTHER PUBLICATIONS

Notice of Allowance dated Aug. 4, 2014, U.S. Appl. No. 13/744,847, filed Jan. 18, 2013.
FAIPP Pre-Interview Communication dated Jul. 16, 2014, U.S. Appl. No. 13/744,861, filed Jan. 18, 2013.
Notice of Allowance dated Nov. 22, 2014, U.S. Appl. No. 13/744,861, filed Jan. 18, 2013.
First Action Interview Pre-Interview Communication dated Oct. 22, 2014, U.S. Appl. No. 13/763,428, filed Feb. 8, 2013.
First Action Interview Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
First Action Interview Pre-Interview Communication dated Nov. 20, 2014, filed on May 21, 2013.
Foreign Communication from a Related Counterpart—International Search Report and Written Opinion, dated Feb. 29, 2012, PCT/US2011/063736, filed on Dec. 7, 2011.
Foreign Communication from a Related Counterpart Application, "Preliminary Report on Patentability", dated Jun. 20, 2013, PCT/US2011/063736 filed on Dec. 7, 2011.
Foreign Communication from a Related Counterpart—International Search Report and Written Opinion, dated Jul. 24, 2013, PCT/US13/40278, filed on May 9, 2013.
Foreign Communication from a Related Counterpart—International Search Report and Written Opinion, dated Nov. 14, 2013, PCT/US13/55023, filed on Aug. 15, 2013.
Foreign Communication From a Related Counterpart Application, International Search Report and Written Opinion dated Jan. 24, 2014, PCT/US13/68981 filed on Nov. 7, 2013.
Foreign Communication from a Related Counterpart—International Search Report and Written Opinion, dated May 19, 2014, PCT/US14/13936, filed on Jan. 30, 2014.
Foreign Communication from a Related Counterpart—International Search Report and Written Opinion, dated May 14, 2014, PCT/US14/13939, filed on Jan. 30, 2014.
Foreign Communication from a Related Counterpart—International Search Report and Written Opinion, dated Jun. 3, 2014, PCT/US14/16650, filed on Feb. 16, 2014.
Foreign Communication from a Related Counterpart Application, "Preliminary Report on Patentability," dated Nov. 20, 2014, PCT/US13/40278 filed on May 9, 2013.
Foreign Communication from a Related Counterpart—International Search Report and Written Opinion, dated Dec. 17, 2014, PCT/US14/46773, filed on Jul. 16, 2014.
Foreign Communication from a Related Counterpart—International Search Report and Written Opinion, dated Dec. 30, 2014, PCT/US14/56778, filed Sep. 22, 2014.
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 14/522,586, filed Oct. 24, 2014.
Annan, Brandon C., et al., "System and Method of Branding and Labeling a Mobile Device", filed Mar. 15, 2013, U.S. Appl. No. 13/844,104.
Annan, Brandon C., et al., "Electronic Fixed Brand Labeling", filed Feb. 8, 2013, U.S. Appl. No. 13/763,443.
Ghoshal, Jagannath, et al., "Rebranding a Portable Electronic Device While Maintaining User Data", filed May 22, 2013, U.S. Appl. No. 13/899,567.
Ghoshal, Jagannath, et al., "System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Delivery of Branding Content and Customizations to a Mobile Communication Device", filed Sep. 22, 2014, International Serial No. PCT/US14/56778.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
IEEE, "Part 11: Wireless LAN Medium Access Control (MAC) and Physical layer (PHY) specifications," Std.802.11d-2001, May 23, 2014.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.

(56) References Cited

OTHER PUBLICATIONS

FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013.
Foreign Communication From a Related Counterpart Application, International Preliminary Report on Patentability dated Aug. 20, 2015, PCT/US14/13936, filed on Jan. 30, 2014.
Foreign Communication From a Related Counterpart Application, International Preliminary Report on Patentability dated Aug. 20, 2015, PCT/US14/13939, filed on Jan. 30, 2014.
Foreign Communication From a Related Counterpart Application, International Preliminary Report on Patentability dated Sep. 24, 2015, PCT/US14/16650, filed on Feb. 16, 2014.
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
Notice of Allowance dated Apr. 13, 2016, U.S. Appl. No. 14/877,215, filed Oct. 7, 2015.
EP Search Report dated May 17, 2016, European Application No. 14749499.1, filed on Feb. 8, 2013.
Office Action dated May 3, 2016, U.S. Appl. No. 13/763,443, filed Feb. 8, 2013.
Notice of Allowance dated May 6, 2016, U.S. Appl. No. 14/820,522, filed Aug. 6, 2015.
Advisory Action dated May 3, 2016, U.S. Appl. No. 14/060,712, filed Oct. 23, 2013.
Advisory Action dated Apr. 20, 2016, U.S. Appl. No. 14/060,719, filed Oct. 23, 2013.
Office Action dated Jun. 6, 2016, U.S. Appl. No. 14/060,719, filed Oct. 23, 2013.
Office Action dated May 10, 2016, U.S. Appl. No. 14/163,035, filed Jan. 24, 2014.
Final Office Action dated Jun. 14, 2016, U.S. Appl. No. 13/968,259, filed Aug. 15, 2013.
Notice of Allowance dated Apr. 20, 2016, U.S. Appl. No. 14/297,429, filed Jun. 5, 2014.
Notice of Allowance dated Apr. 13, 2016, U.S. Appl. No. 14/163,041, filed Jan. 24, 2014.
Final Office Action dated Apr. 19, 2016, U.S. Appl. No. 14/231,718, filed Mar. 31, 2014.
Advisory Action dated Jun. 28, 2016, U.S. Appl. No. 14/231,718, filed Mar. 31, 2014.
Benjamin, Jeff, "How to change your iPhone carrier logo without jailbreaking," idownloadblog.com, Dec. 31, 2012.
Wikipedia, "Motorola Fone," Mar. 21, 2016.
Mobile Gazette, Motorola FONE F3 Review, www.mobilegazette.com, Sep. 16, 2007.
Delker, Jason R., et al. "Network Access Tiered Based on Application Launcher Installation," filed May 25, 2016, U.S. Appl. No. 15/164,530.
EP Search Report dated Oct. 12, 2016, EP International Application No. 11847301.6, filed on Jun. 20, 2013.

(56) References Cited

OTHER PUBLICATIONS

Final Office Action dated Oct. 26, 2016, U.S. Appl. No. 13/468,028, filed May 9, 2012.
Office Action dated Dec. 29, 2016, U.S. Appl. No. 14/060,712, filed Oct. 23, 2013.
Notice of Allowance dated Nov. 2, 2016, U.S. Appl. No. 14/163,035, filed Jan. 24, 2014.
Japanese Office Action dated Apr. 13, 2017, JP Application Serial No. 2015-531933; filed on Feb. 16, 2015.
Notice of Allowance dated Apr. 17, 2017, U.S. Appl. No. 14/060,712, filed Oct. 23, 2013.
Final Office Action dated Jan. 26, 2017, U.S. Appl. No. 14/060,719, filed Oct. 23, 2013.
Advisory Action dated Mar. 24, 2017, U.S. Appl. No. 14/060,719, filed Oct. 23, 2013.
Notice of Allowance dated Feb. 21, 2017, U.S. Appl. No. 14/231,718, filed Mar. 31, 2014.
FAIPP Pre-Interview Communication dated Apr. 10, 2017, U.S. Appl. No. 15/164,530, filed May 25, 2016.
Examiner's Answer dated Aug. 14, 2017, U.S. Appl. No. 13/468,028, filed May 9, 2012.
EP Notice of Intention to Grant dated May 26, 2017, European Application No. 14749499.1, filed on Feb. 8, 2013.
Notice of Allowance dated Jun. 14, 2017, U.S. Appl. No. 15/164,530, filed May 25, 2016.
Office Action dated May 31, 2017, U.S. Appl. No. 15/265,833, filed Sep. 14, 2016.
Urbanek, Robert E., "Delivery of Branding Content and Customizations to a Mobile Communication Device," filed Jun. 26, 2017, U.S. Appl. No. 15/633,737.
Indurkar, Dhananjay, "Mobile Phone Differentiated Set-Up," filed May 1, 2017, U.S. Appl. No. 15/584,001.
Japanese Decision for Grant dated Jan. 9, 2018, Japanese Application Serial No. 2015-553721; filed on Jan. 18, 2013.
Japanese Decision for Grant dated Dec. 19, 2017, Japanese Application Serial No. 2015-556971; filed on Jun. 24, 2015.
Final Office Action dated Jan. 18, 2018, U.S. Appl. No. 15/063,383, filed Mar. 7, 2016.
FAIPP Pre-Interview Communication dated Dec. 28, 2107, U.S. Appl. No. 15/268,347, filed Sep. 16, 2016.
Japanese Final Office Action dated Aug. 23, 2017, JP Application Serial No. 2015-531933; filed on Feb. 16, 2015.
Japanese Office Action dated Sep. 6, 2017, Japanese Application Serial No. 2015-553721, filed on Jan. 18, 2013.
Examiners Answer dated Aug. 28, 2017, U.S. Appl. No. 14/060,719, filed Oct. 23, 2013.
FAIPP Pre-Interview Communication dated Sep. 6, 2017, U.S. Appl. No. 15/063,383, filed Mar. 7, 2016.
FAIPP Office Action dated Oct. 16, 2017, U.S. Appl. No. 15/063,383, filed Mar. 7, 2016.
Notice of Allowance dated Oct. 27, 2017, U.S. Appl. No. 15/265,833, filed Sep. 14, 2016.
Foreign Communication from a Related Counterpart—International Preliminary Report on Patentability, dated Aug. 24, 2017, PCT/US16/13272, filed on Jan. 13, 2016.
Japanese Office Action dated Feb. 28, 2018, Japanese Application Serial No. 2015-556972; filed Jun. 25, 2015.
Office Action dated Mar. 13, 2018, U.S. Appl. No. 15/584,001, filed May 1, 2017.
Notice of Allowance dated Mar. 22, 2018, U.S. Appl. No. 15/268,347, filed Sep. 16, 2016.

* cited by examiner

OUT OF THE BOX EXPERIENCE (OOBE) COUNTRY CHOICE USING WI-FI LAYER TRANSMISSION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be purchased at service provider retail stores, electronics retail stores, and/or at general retail stores. A variety of activities may be performed to bring a new mobile communication into service. To use a mobile communication device on a cellular network, it may first be provisioned and/or activated. Provisioning a mobile communication device (e.g. a mobile phone) to operate on a wireless network involves defining and/or adjusting the mobile communication device's settings that are stored in the device and the settings stored on the network, so that the mobile communication device may properly access communication services and/or execute one or more desired applications, and the network may recognize the mobile communication device as authorized to receive service for those applications.

SUMMARY

In an embodiment, a mobile communication device is disclosed. The mobile device is a generic device operable for use in a plurality of different countries and comprises a short range radio transceiver, a processor, a memory, and an application stored in the memory and that, when executed by the processor during an activation process of the mobile communication device, is to operable to detect beacons from one or more wireless access points using the short range radio transceiver; determine the country code of at least one of the beacons detected from the wireless access point, wherein the country code is associated with one or more languages; determine a language to present on the mobile communication device, during the activation process, based on the country code; and present an activation screen to a user in one of the languages associated with the country code.

In an embodiment, a method for determining the language to present on a mobile communication device during activation is disclosed. The method comprises: detecting beacons by an application on the mobile communication device radiated from one or more wireless access points, wherein the mobile communication device is located within the ranges of the one or more wireless access points; determining the country code of at least one of the beacons, detected from the wireless access point, by an application on the mobile communication device, wherein the country code is associated with one or more languages; determining a language by the application to present on the mobile communication device based on the country code; and presenting an activation screen to a user in one of the languages associated with the country code, wherein the activation screen comprises an option for the user to change the chosen language.

In an embodiment, a method for completing an activation process on a mobile communication device comprising a carrier memory partition is disclosed. The method comprises: detecting beacons by an application on the mobile communication device radiated from one or more wireless access points; determining one or more language associated with at least one of the beacons by an application on the mobile communication device; determining a language by the application to present on the mobile communication device based on the languages associated with the beacon; presenting an activation screen to a user in the determined language, wherein the activation screen comprises an option for the user to change the chosen language; after the language is chosen, receiving an activation payload in the chosen language; completing an activation process on the mobile communication device in the chosen language; and writing, by an application programming interface, to the carrier partition instructions for language presentation on the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
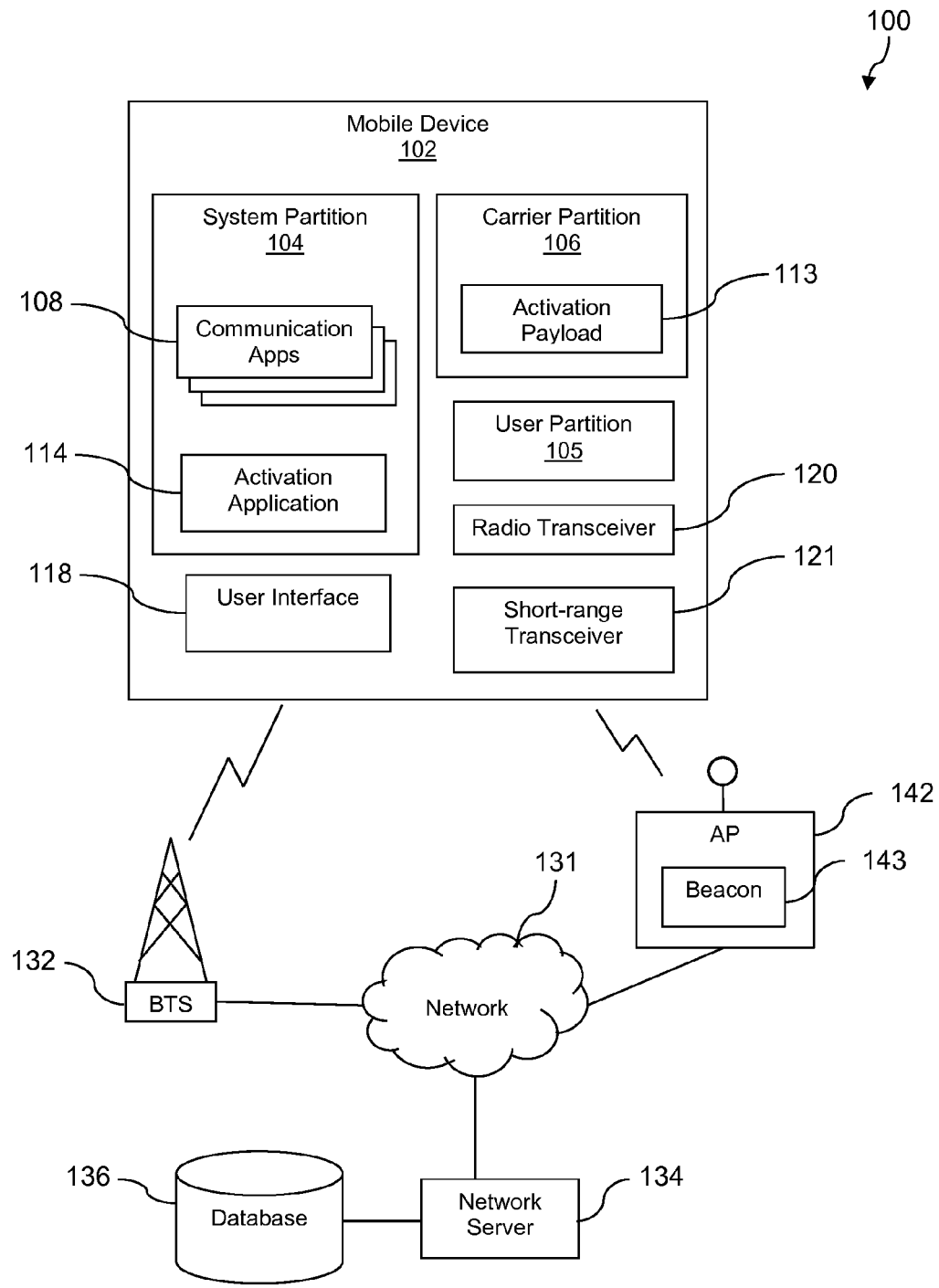
FIG. 1 is an illustration of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for completing an activation process on a generic mobile communication device and determining a language to be used on the mobile communication device, for example, a language for text in user interfaces presented on a display of the device and for a voice based interface of the device. The mobile device may be operable for use in a plurality of different countries before activation; the activation process may configure the device for use in a specific country and using a specific language for presenting information to a user of the device. After a generic mobile communication device is purchased by a user, the activation process may be completed, where custom settings and information (or customization content) may be delivered to or accessed on the mobile device, thereby transforming the device from a generic device to a customized and/or branded mobile communication device. Activation may involve provisioning mobile communication service functionality for the mobile device in one or more network servers, for example defining an association between a unique identifier of the device (mobile equipment identity (MEID) or equipment serial number (ESN)) and a phone number or mobile station number (MSN). Customization content may include graphics, images, audio files, splash screens, opening screens, backgrounds, and tones.

Customization content may also include customer service numbers, links to messaging platforms, IP addresses and port numbers, client identification, and market catalogs. The customization content may be used to complete the activation process on the mobile device, where the customization content may be installed, downloaded, and/or otherwise accessed during the activation process. In some cases, the activation process may be completed by an application on the mobile device, such as an activation application. In some cases, the activation process may be initiated when an activation payload is delivered to the mobile device. The activation payload may comprise instructions for completing the activation process.

To download customization content and/or an activation payload to a mobile device, the mobile device may first establish a connection to a cellular network. An activation application of the mobile device (or another communication application) may be operable to detect available network connection options (or communication channels) between the mobile device and the network, wherein the connection options include wireless access points.

In some cases, an initial step of the activation process may be to choose the language to be presented by the mobile device. Some devices may have a default language built in. The present disclosure teaches the mobile device may comprise an application operable to determine the language(s) to be presented by the mobile device during activation based on information received from wireless access points in proximity to the mobile device. For example, a beacon transmitted by a wireless access point may contain information about the country and/or the language, such as a country code or elements or a language code or element. The application on the mobile device may receive this information from the beacon of the wireless access point(s), possibly without establishing a connection with the wireless access point(s). The purpose of the beacon (and other information) broadcasted by the wireless access point is to promote WLAN communication for Wifi radios (e.g., to enable such WiFi radios to identify and to connect to the access points whereby to connect to the Internet), not to promote a mobile device activation functionality. The present disclosure teaches that the information contained within the beacon may be used by the mobile device without establishing a connection with the wireless access point (to the Internet).

In some cases, the country code from the beacon may be associated with one or more languages, such as a language or list of languages most likely to be spoken in that country. The application may use the information received from the beacon to determine a language to present during the initial activation process on the mobile communication device.

The mobile communication device may comprise a generic device which may be sold in multiple countries. With the functionality described above for determining the presented language on the device, implemented by an application on the device, the mobile device may be sold as is in any country without existing language settings on the device. This may allow for more flexibility in the customization of the device, and may more quickly and easily determine the correct language for a particular user.

In some cases, the application may present a first activation screen to a user in the language chosen based on the country code (or language code), and the activation screen may include an option for the user to change the presented language. Then, subsequent activation screens may allow for the user to choose a language, possibly from a list of languages associated with the country code. Once a language is chosen by the user (or accepted by the user), an activation process may be completed on the device in the chosen language.

The mobile communication device may have memory established as a system memory partition and a user memory partition. An operating system of the mobile communication device may restrict write access to the system memory partition and may prevent the contents of the system memory partition being erased during reset operations, for example resetting to factory defaults. For example, a user may be prevented from writing to the system memory partition and/or from causing writing to the system memory partition. By contrast, the operating system of the mobile communication device may allow unrestricted write access to the user memory partition. For example, a user of the mobile communication device may be permitted by the operating system to write information into the user memory partition, at least indirectly by exercising user interface control selections, for example entering personal contacts, installing third party applications, downloading ring tones, and the like. During a reset, for example during a reset to factory defaults, the information in the user memory partition may be deleted by the operating system. The ANDROID operating system used by some mobile communication devices may establish a system memory partition and a user memory partition.

The operating system may further provide write access to a carrier memory partition to privileged users or automated processes. For example, an individual providing a carrier memory partition key or password, for example an employee or contractor associated with a wireless communication service provider, may be allowed by the operating system to write to the carrier memory partition. Alternatively, instructions that execute on the mobile communication device may be granted the privilege to write to the carrier memory partition by the operating system based on the instructions providing the key or password. In an embodiment, the key or password is unavailable and unknown to a user of the mobile communication device, for example the key or password may only be known to the wireless service provider and/or carrier. In some cases, this may be used when the activation payload and/or customization content is delivered to the device to prevent unwanted access to the secure information. For example, if the mobile device is reset for any reason, the activation payload may be retained in the carrier partition.

In an embodiment, the instructions may invoke an application programming interface (API) provided by the operating system to write to the carrier memory partition, and the API call may entail providing the key or password associated with the carrier memory partition. In some contexts, this may be referred to as a carrier memory partition key or a carrier memory partition password. An automated procedure or function executed on the mobile communication device that presents a carrier memory partition key or password, for example a script wirelessly transmitted to the mobile communication device, may be permitted to write to the carrier memory partition. The carrier memory partition may be used to store branding information. The carrier memory partition further may be used to store other information unrelated to branding and/or customization content, such as language information or content for the device. For further details about carrier memory partitions, see U.S. patent application Ser. No. 13/763,428, filed Feb. 8, 2013, entitled "System and Method of Storing Service Brand Packages On a Mobile Device," by Brandon C. Annan, et al., which is hereby incorporated by reference in its entirety.

Turning now to FIG. 1, a communication system 100 is described. In an embodiment, the communication system 100 comprises a mobile communication device 102 comprising a cellular radio transceiver 120, optionally a short-range radio transceiver 121, a user interface 118, and a plurality of communication applications 108. The mobile communication device 102 may engage in a variety of communication exchanges. The mobile communication device 102 may be a mobile phone, a wearable computer, a headset computer, a personal digital assistant (PDA), a media player, a laptop computer, a tablet computer, or another electronic device having a macro cellular radio transceiver.

The user interface 118 of the mobile device 102 may, in some embodiments, comprise a display, an input system, a speaker system, and/or a microphone. In some embodiments, the display may comprise a screen, and the input system may comprise a keypad and/or a touch screen, for example. The speaker system may communicate audio (such as media, messages, ring tones or phone call audio) to a user of the mobile device 102. The microphone may receive voice and/or audio from a user and/or communicate audio to a user. In an embodiment, a user may utilize the user interface 118 to communicate with the mobile device 102, for example, to initiate the execution of one or more of the communication applications 108. Additionally, a user may receive communication from the mobile device 102 via the user interface 118, such as phone calls, text messages, messages, emails, contact information, caller identification, call history, internet access, etc. A user may additionally employ the user interface 118 for viewing and/or listening to media such as music, movies, shows, videos, photos, games etc. Additionally, the user interface 118 may comprise advertisement spaces that may be operable to present advertisement data or content to a user via portions of the user interface 118, such as when a user is operating a communication application 108 on the device 102. The user interface 118 may be employed during an activation process to receive inputs from the user, such as preferences, personal information, settings, etc.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile communication device 102 may couple to the network 131 by a variety of communication paths. The mobile communication device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile communication device 102 may communicate with the base transceiver station (BTS) 132 via the cellular radio transceiver 120 of the mobile communication device 102. The wireless link between the mobile communication device 102 and the base transceiver station 132 may couple the mobile communication device 102 to the network 131. Additionally, the base transceiver station 132 may also be known as a cell tower or an enhance node B (eNB). In some embodiments, the network 131 may provide communication with one or more network servers 134, wherein the network severs 134 may provide access to one or more database 136.

It is understood that the system 100 may comprise any number of mobile communication devices 102 and any number of base transceiver stations 132. The collectivity of base transceiver stations 132 may be said to comprise a radio access network, in that these base transceiver stations 132 may provide radio communication links to the mobile communication devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

In some embodiments, the mobile communication device 102 may be operable to communicate with the network 131 via one or more wireless access point (AP) 142. In some embodiments, the mobile device 102 may communicate with a wireless access point 142 via a short-range radio transceiver 121. The short-range radio transceiver 121 may comprise a Wifi transceiver, a Bluetooth® transceiver, or another short-range transceiver, wherein "short-range" may be defined as having a maximum range of less than about a mile, of less than about half a mile, or of less than about ¼ mile.

In some embodiments, wireless access points 142 may comprise one or more beacon packets, wherein the beacon 143 may be transmitted by the wireless access point 142 to be received by any communication devices (such as the mobile communication device 102) within the range of the access point 142. For example, a beacon 143 may comprise a country code or element, wherein the beacon 143 may comprise information about the country or location of the access point 142. In some embodiments, the country code may contain the information required to allow a station to identify the regulatory domain in which the wireless access point 142 is located, allowing for connection with the wireless access point 142. In some embodiments, a country code or element may be associated with one or more languages, such as the languages most likely spoken in that country. In some embodiments, the beacon may comprise a language code or element, which may comprise one or more languages associated with the wireless access point 142, possibly based on the location of the wireless access point 142.

The fundamental use and intent of the beacon 143 may be to announce the service of the wireless access point 142 and provide identifying information to promote devices linking through the access point 142 to the network 131. This linking may, in some cases, require security credentials. In the present disclosure, the identifying information of the access point 142 (contained in the beacon 143) may be used in an unintended way, to assist in the set-up and activation of the mobile device 102. For example, during the initial, out-of-the-box, operation of the mobile communication device 102, the mobile communication device 102 may attempt to begin the activation process. One of the initial steps in the activation process may comprise selecting a language for the mobile communication device 102 to present to the user. In some embodiments, the presented language may be determined using the country or language code (or element) from the beacon of at least one wireless access point 142, wherein, in some embodiments, an activation application 114 may search for information from one or more wireless access points 142.

In some embodiments, the country code (or element) may be associated with one or more languages. In some embodiments, the country code may be associated with one language, which may be the official language of that country. In other embodiments, the country code may be associated with a list of languages, wherein the list may comprise languages most likely to be spoken in that country. In some embodiments, the list of languages may be ranked by most likely to be spoken by a user in that country. In some embodiments, the language association (and other information about the languages, such as ranking) may be contained within the beacon 143 (for example within the country code and/or as a language code or element). In other embodiments, the language association (and other information about the languages, such as ranking) may be contained within an application 108 (possibly the activation application 114) on the mobile communication device 102, wherein, when a country code is received or recognized by the mobile communication device 102, the application 108 may map the country code to a language or list of languages based on the country code. In other words, the language information associated with the country code(s) may be stored on the mobile device 102 and accessed by the application 108. The indicated language(s) may be used in the out-of-the-box activation process.

In some embodiments, an activation screen may be presented to the user (via the user interface 118), wherein the activation screen may be presented in a language chosen based on the country code and/or language code received from at least one wireless access point 142. In some embodiments, the activation screen may comprise an option for the user to change the chosen language from the initially present language. This may be helpful if the user is travelling in a country where they do not speak the national language, but are purchasing/activating a mobile device. In some embodiments, if the user chooses to change the chosen language, a second activation screen may be presented to the user with at least one other language option, wherein the language options are selected based on the country code and/or language code. For example, the first activation screen may be presented in the language indicated as most likely to be spoken based on the country code (or language code). Then the second activation screen may be presented in the language indicated as next likely (in a ranked list) to be spoken based on the country code. Alternatively, the second activation screen may present a list of languages, such as a list of the mostly likely languages to be spoken based on country code, wherein a user may chose a language from the list.

For example, a country may have more than one national language, or commonly spoken language, wherein these languages may be included on the list, and possibly ranked highest on the list. Additionally, a country (or region of a country) may frequently have a lot of visitors, business travelers, or tourists from other countries, wherein the list of languages may include the languages of the people who most frequently travel there. A small number of languages may be offered, via one of the activation screens, based on regional proximity and travel statistics.

In some embodiments, the second activation screen may comprise an option for the user to choose another language that is not presented by the second activation screen. If the user chooses this option, a third activation screen may be presented, wherein the third activation screen may comprise the next most likely language (in a ranked list). Alternatively, the third activation screen may present a more comprehensive list of languages, such as a full list of the languages available to be used by the mobile communication device 102. After a language has been chosen by the user (or accepted by the user from the first activation screen), the activation process may be continued in the chosen language, wherein an activation payload may be downloaded to the device for that language.

In some embodiments, at least partial payloads may be downloaded to the mobile communication device 102 based on the country code and/or language code, possibly before a language is chosen by a user (as described above). For example, a list of the most likely languages to be spoken may be determined based on the country code (or language code), and then payloads in the languages from the list may begin to download to the mobile device, possibly before a language is chosen by the user. In some embodiments, once a language is chosen by the user, the payloads in other languages may be stopped from downloading, and may possibly be removed from the mobile device 102.

In some embodiments, the mobile communication device 102 may detect a beacon 143 from more than one wireless access point 142. In some embodiments, the mobile device 102 (via an application 108) may determine the strongest beacon 143, wherein information from that beacon 143 may be used to determine the language to be presented on the mobile device 102. In other embodiments, the mobile device 102 may receive information from beacons 143 from more than one wireless access point 142, wherein the information may be corroborated and/or compared to determine the language to present on the mobile device 102.

In some embodiments, during the initial, out-of-the-box, operation of the mobile communication device 102, the mobile communication device 102 may attempt to establish a connection with the network 131 to begin the activation process. In some embodiments, the mobile communication device 102 may use a connection via the wireless access point 142 (or another connection to the network 131) to receive an activation payload and/or complete an activation process on the mobile communication device 102. For example, the wireless access point 142 may be at a retail store where the mobile communication device 102 is purchased, at the residence or workplace of the user of the mobile communication device 102, and/or a corporate office where the mobile communication device 102 may be configured by a company before being used by an employee of the company. The wireless access point 142 may provide a wireless communication link to the mobile communication device 102 using a WiFi communication protocol or another short-range radio communication protocol (such as near-field communication and/or Bluetooth®). The wireless access point 142 may be communicatively coupled to the network 131 and may communicatively couple the mobile communication device 102 to the network 131.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory of the mobile communication device 102. The communication applications 108 may expose application programming interfaces (APIs) accessible to other applications to provide wireless communication functionality to the other applications.

The communication applications 108 may be any of a variety of applications. One of the communication applications 108 may be a telephone application that receives dialed digits and attempts to originate a voice call—for example a voice over IP (VoIP) call—to a called telephone. The telephone application may also promote receiving voice calls originated by another communication device. One of the communication applications 108 may be a web browser application that requests content from the network 131, for example by sending out a hypertext transport protocol (HTTP) message embedding a universal reference locator (URL). One of the communication applications 108 may be a media player that requests streaming or downloading media from the network 131. Many of the communication applications 108 may depend upon communication service provided by an IMS network to deliver their functionality to an end user of the mobile communication device 102. One of the communication applications 108 may comprise a mobile transaction interface, where a user may complete a purchase using the application, and secure information, such as credit card information, may be communicated through the application. In some embodiments, the communication applications 108 may be stored in a system memory partition 104 of the memory of the mobile communication device 102.

In some embodiments, the mobile communication device 102 may comprise a memory system divided into one or more partitions. The partitions may include a system memory partition 104, a carrier memory partition 106, and a user memory partition 105. In some embodiments, content may be stored and/or executed in one or more of the memory partitions. In some embodiments, the content stored in the memory of the mobile communication device 102 may be associated with the manufacturer of the device, or may be content that is pre-loaded onto the device. In some embodiments, the communication applications 108 may be stored in the system memory partition 104.

Additionally, an activation application 114 may be stored and/or executed in the system memory partition 104, wherein the activation application 114 may be operable to complete customization or activation processes for the mobile communication device 102. In some embodiments, one or more of the memory locations may comprise non-volatile or persistent memory. In some embodiments, the activation process may comprise provisioning the mobile communication device 102, wherein provisioning may comprise setting up the mobile communication device 102 for communication and/or service with the network 131. In other words, provisioning may enable the mobile communication device 102 to connect to the network 131 to allow communication to and from the mobile communication device 102.

In some embodiments, an activation payload 113 may be delivered to the mobile communication device 102 during the initial activation of the device 102, or during a subsequent activation process, such as if the mobile communication device 102 is reset or returned to factory settings. The activation payload 113 may contain information and/or instructions for completing the activation process. In some embodiments, the activation payload 113 may be delivered in accordance with OMA DM (open mobile alliance device management) protocol or framework. In other words, the activation payload 113 may be delivered as an OMA DM payload.

Figure 2A:
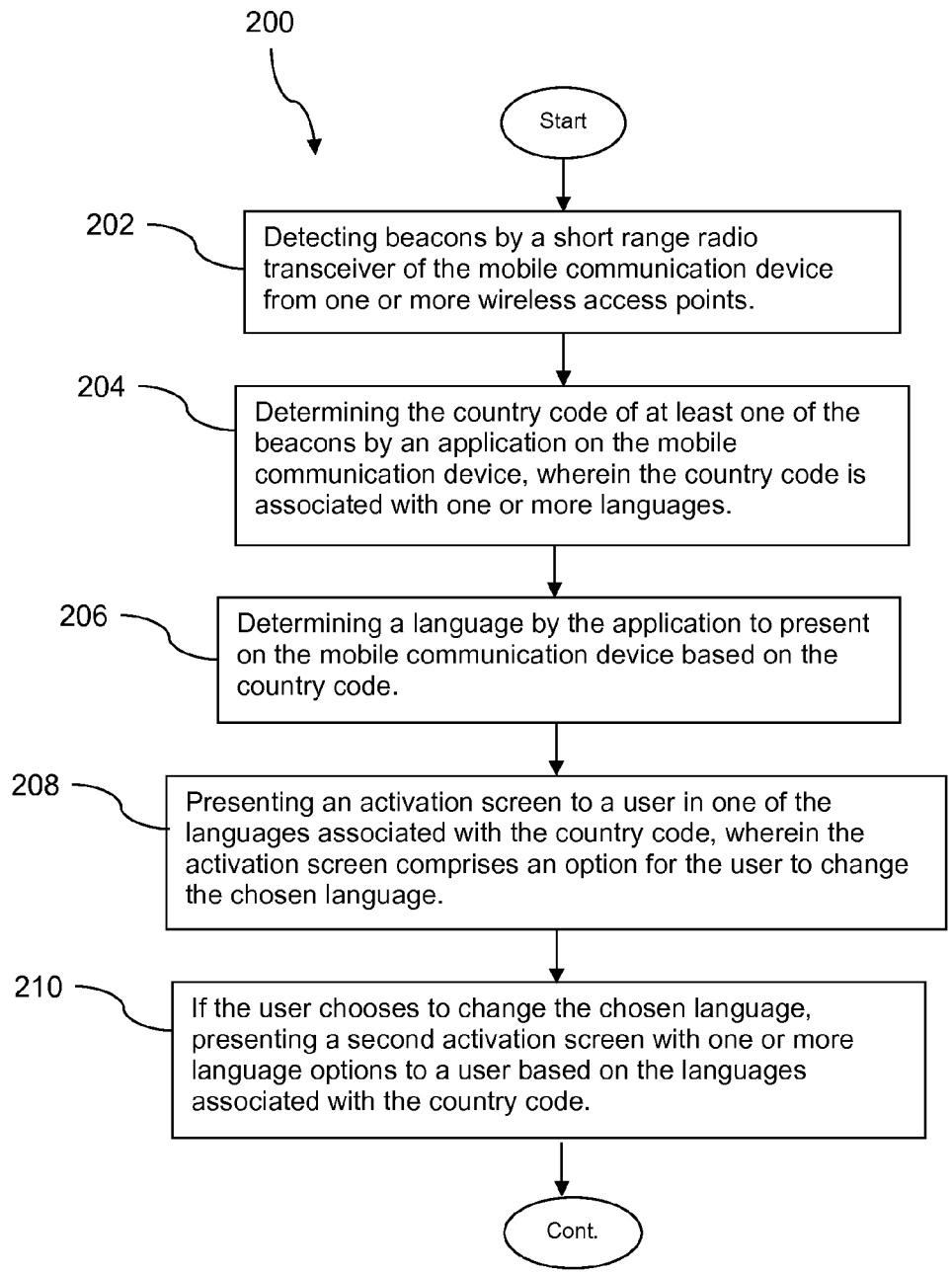
FIGS. 2A-2B are a flow chart illustrating a method according to an embodiment of the disclosure.
Figure 2B:
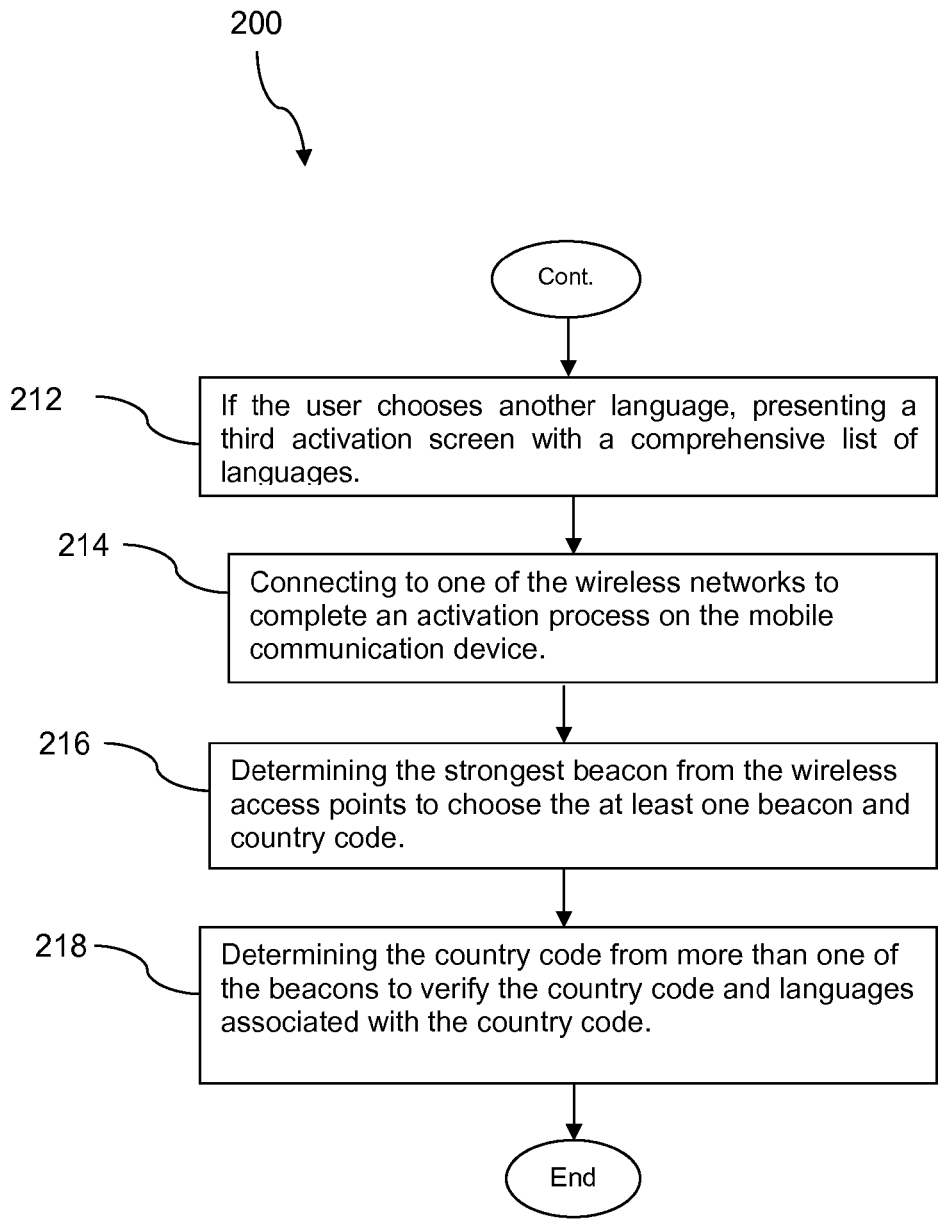

Turning now to FIG. 2, a method 200 for determining the language to present on a mobile communication device during activation is described. At block 202, beacons are detected by a short range radio transceiver of the mobile communication device radiated from one or more wireless access points. At block 204, the country code of at least one of the beacons may be determined by an application on the mobile communication device, wherein the country code is associated with one or more languages. In some embodiments, the determining of the country code may comprise parsing the beacon signal into multiple parts or fields, including parsing out or separating out the country code from the other information contained in the beacon. At block 206, a language may be determined by the application to present on the mobile communication device based on the country code. At block 208, an activation screen may be presented to a user in one of the languages associated with the country code, wherein the activation screen comprises an option for the user to change the chosen language.

In some embodiments, at block 210, if the user chooses to change the chosen language, a second activation screen may be presented with one or more language options to a user based on the languages associated with the country code. In some embodiments, the second activation screen may comprise an option for the user to choose yet another language (that may not be one of the languages associated with the country code). In some embodiments, at block 212, if the user chooses another language, a third activation screen may be presented with a comprehensive list of languages. In some embodiments, the country code may be associated with a plurality of languages, and the languages are ranked by most likely to be spoken by the user. In some embodiments, the method may be completed by an application on the mobile communication device. In some embodiments, at block 214, the mobile communication device may connect to one of the wireless networks to complete an activation process on the mobile communication device. In some embodiments, at block 216, the strongest beacon from the wireless access points may be determined to choose the at least one beacon and country code. In some embodiments, at block 218, the country code from more than one of the beacons may be determined to verify the country code and languages associated with the country code.

Figure 3A:
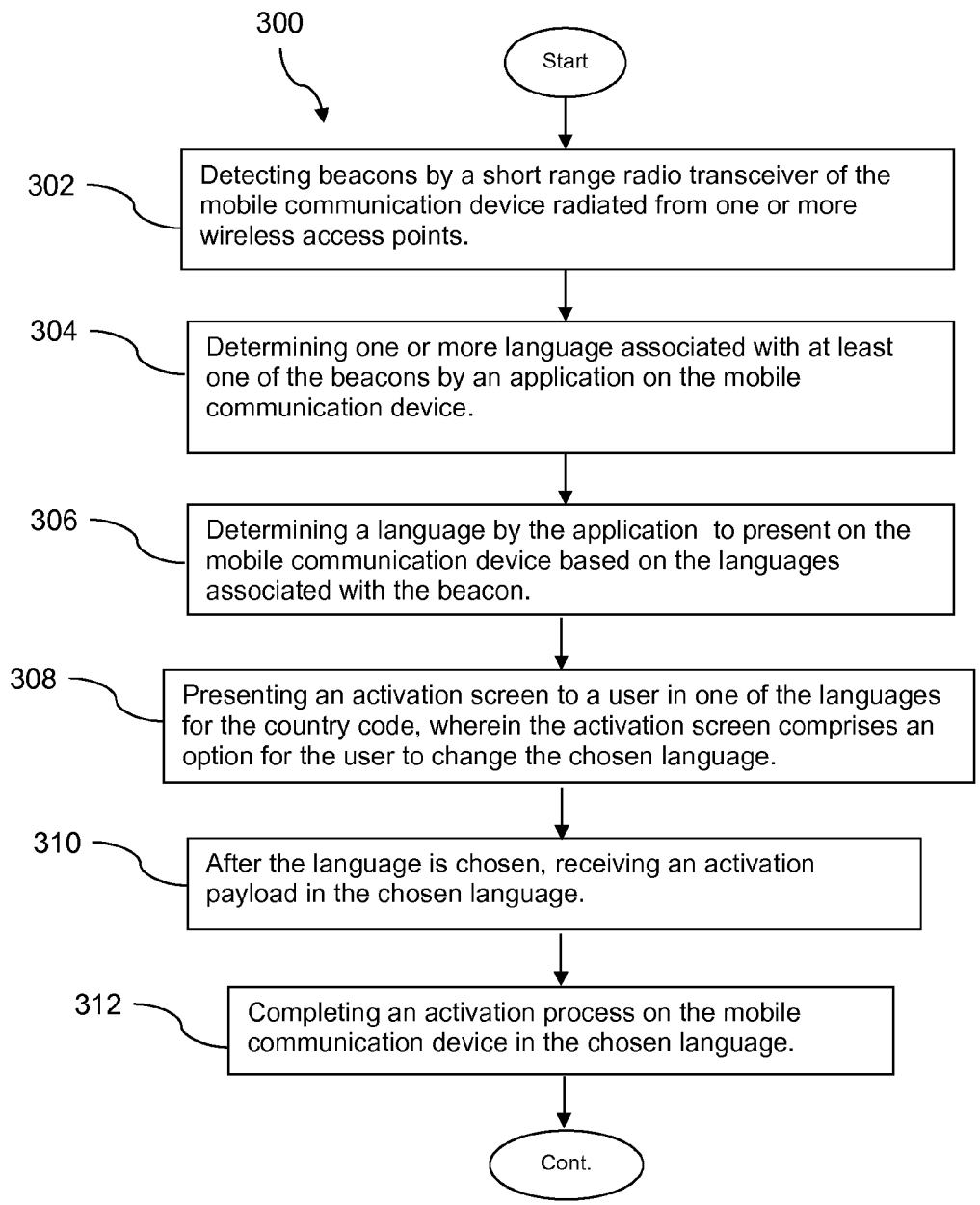
FIGS. 3A-3B are a flow chart illustrating another method according to an embodiment of the disclosure.
Figure 3B:
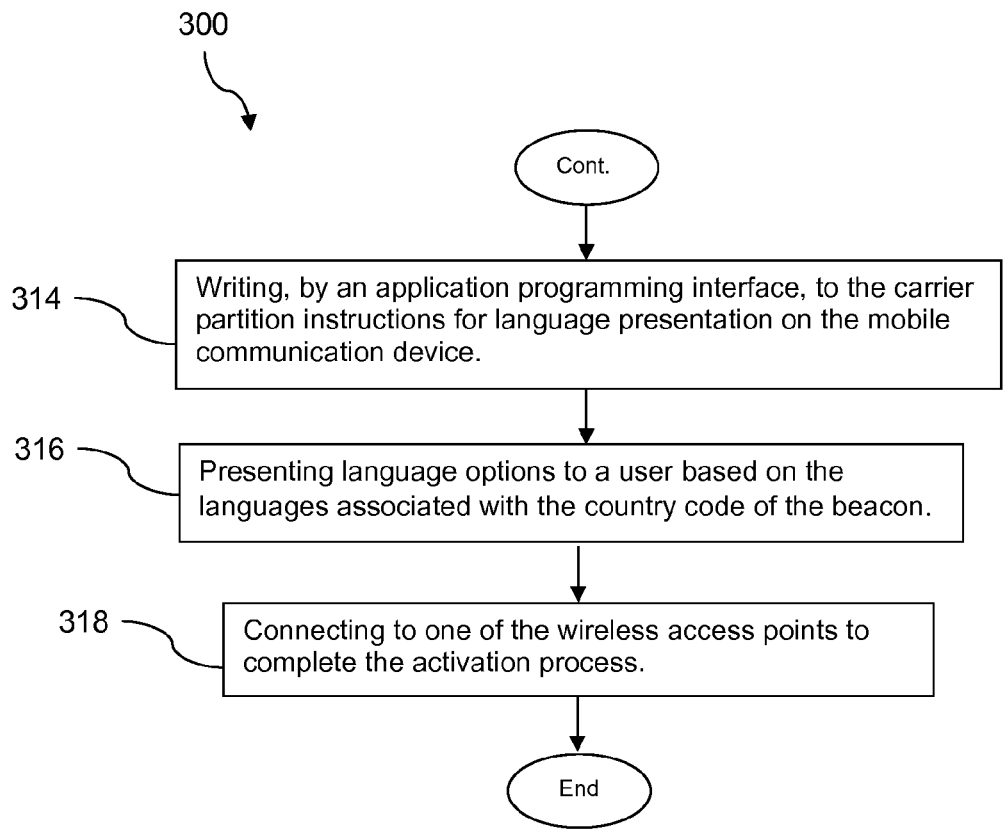

Turning now to FIGS. 3A-3B, a method 300 for completing an activation process on a mobile communication device is described. At block 302, beacons from one or more wireless access points may be detected by a short range radio transceiver of the mobile communication device. At block 304, one or more language may be determined by an application on the mobile communication device, wherein the language may be associated with at least one of the beacons. At block 306, a language may be determined by the application to present on the mobile communication device based on the languages associated with the beacon. At block 308, an activation screen may be presented to a user in the determined language, wherein the activation screen may comprise an option for the user to change the chosen language. At block 310, after the language is chosen, an activation payload may be received in the chosen language. At block 312, an activation process may be completed on the mobile communication device in the chosen language. At block 314, an application programming interface may write to the carrier partition of the mobile communication device instructions for language presentation on the mobile communication device.

In some embodiments, the method may be completed by an activation application on the mobile communication device. In some embodiments, the languages associated with the beacon may be determined from a country code within the beacon. In some embodiments, at block 316, language options may be presented to a user based on the languages associated with the country code of the beacon. In some embodiments, at block 318, the mobile communication device may connect to one of the wireless access points to complete the activation process.

Figure 4:
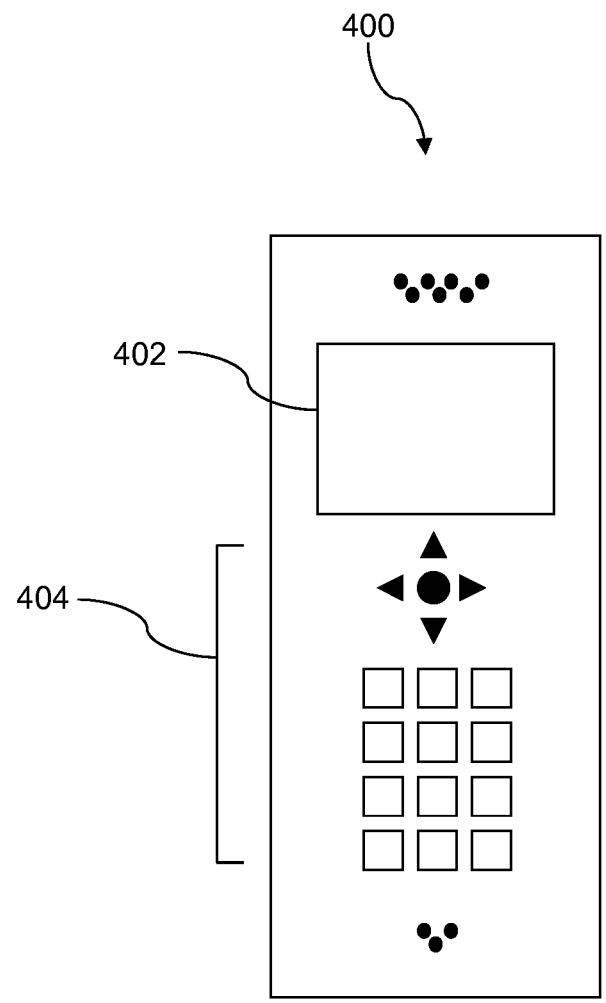
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
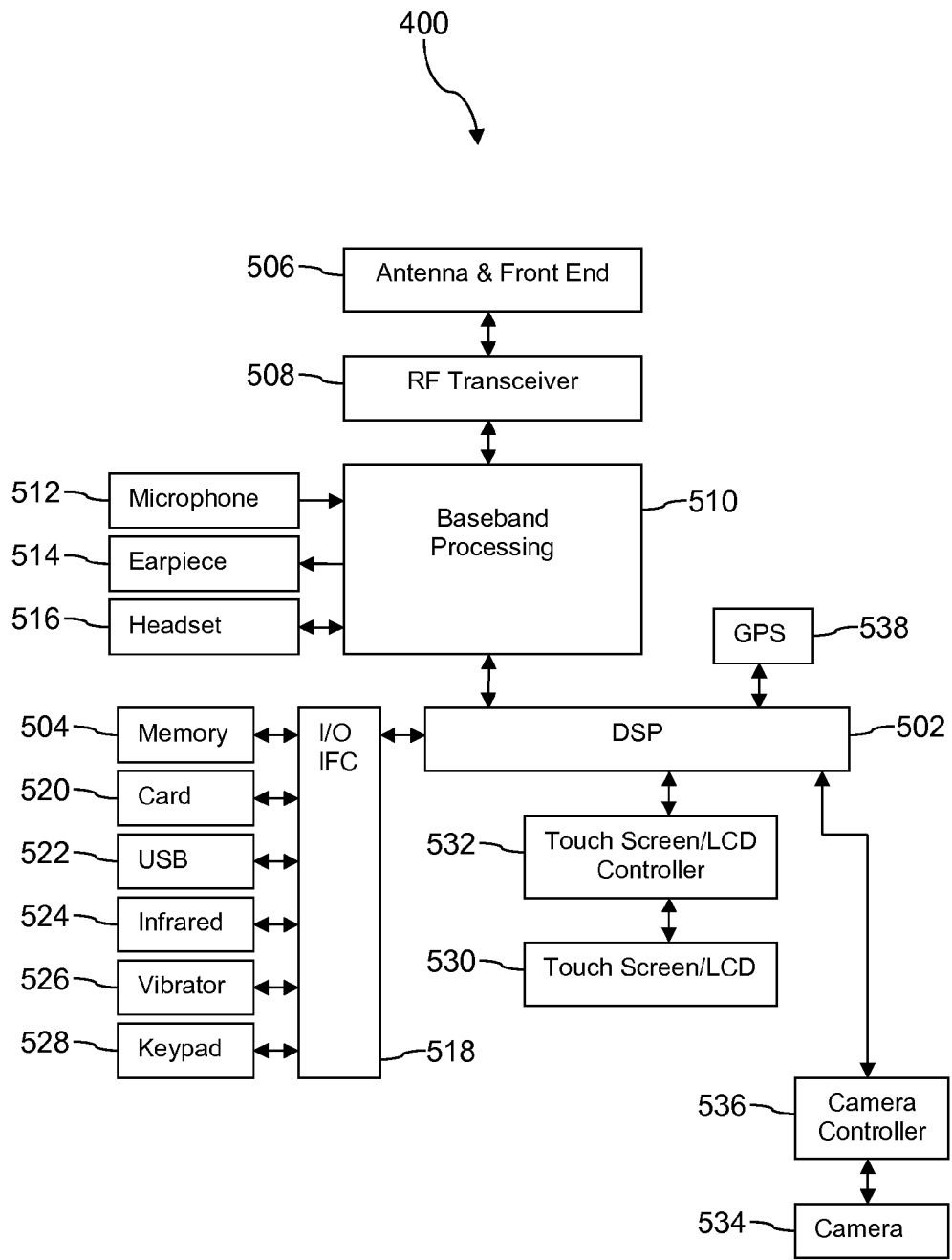
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
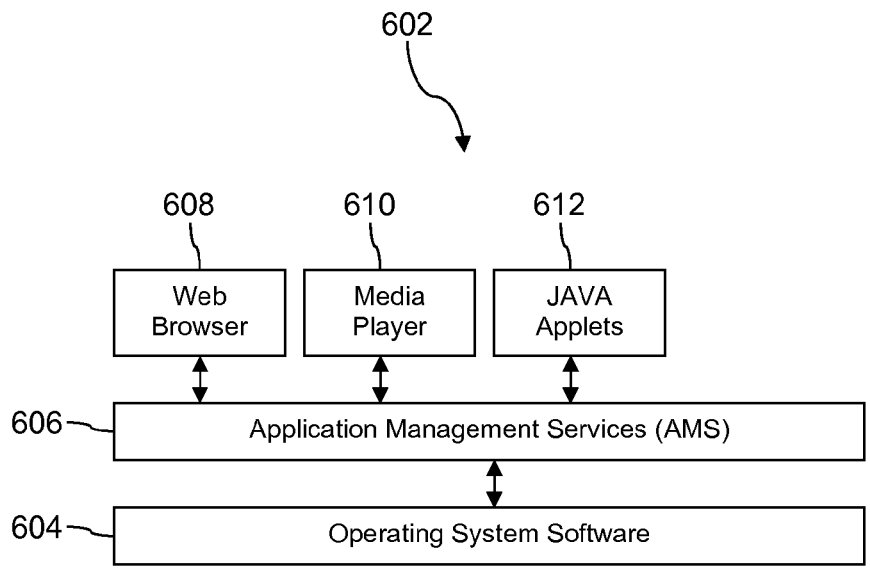
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
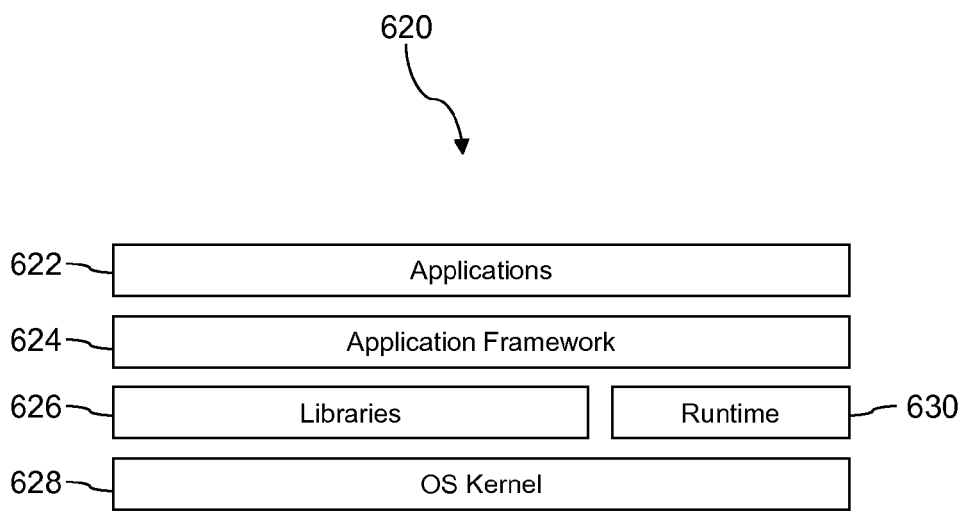
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
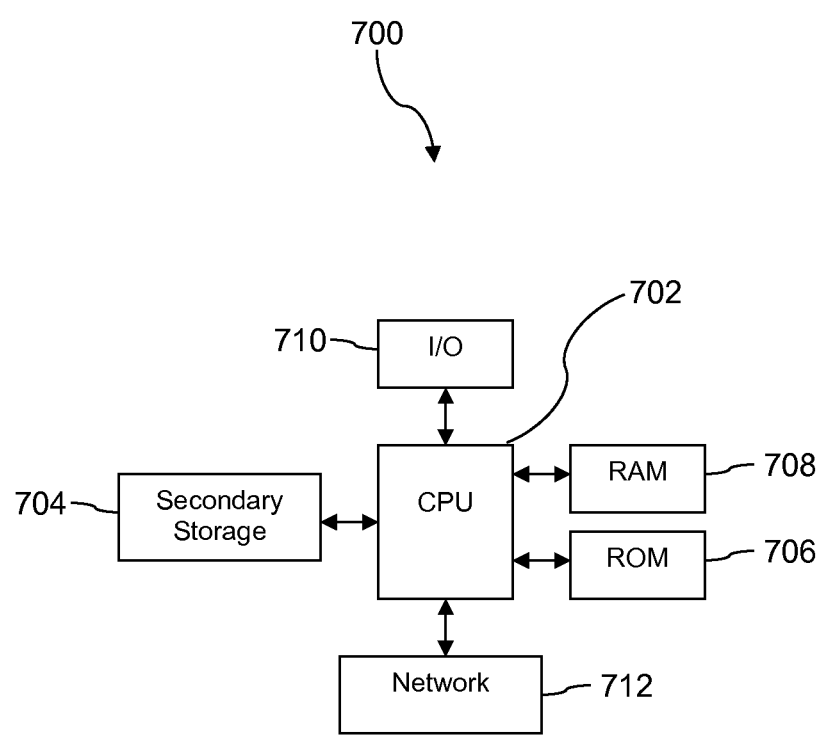
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, wherein the mobile communication device is a generic device operable for use in a plurality of different countries, comprising:
   a short range radio transceiver;
   a processor;
   a memory; and
   an application stored in the memory that, when executed by the processor during an activation process on the mobile communication device, is operable to:
      detect a plurality of beacons from a plurality of wireless access points using the short range radio transceiver;
      determine a country code of at least one beacon of the plurality of beacons detected from the plurality of wireless access points, wherein the country code of the at least one beacon is associated with plurality of languages;
      map the country code of the at least one beacon to a language of the plurality of languages based on the country code of the at least one beacon to determine a language to present on the mobile communication device, during the activation process;
      determine a country code of a second beacon of the plurality of beacons;
      map the country code of the second beacon to one or more languages based on the country code of the second beacon;
      verify, based on the country code of the second beacon, the country code of the at least one beacon;
      verify, based on the mapping of the country code of the second beacon to the one or more languages, the language associated with the country code of the at least one beacon; and
      present an activation screen to a user in the language associated with the country code.

2. The device of claim 1, wherein the activation screen presented by the application comprises an option for a user to change the language.

3. The device of claim 1, wherein the application is further operable to present language options to a user based on the plurality of languages associated with the country code.

4. The device of claim 3, wherein the language options are presented in order by most likely to be spoken by a person in that country.

5. The device of claim 1, wherein the application is also operable to complete the activation process in the language.

6. The device of claim 1, further comprising a user interface operable to present the activation screen and receive inputs from a user.

7. A method for determining a language to present on a mobile communication device during activation comprising:
  detecting a plurality of beacons by a short range radio transceiver of the mobile communication device radiated from a plurality of wireless access points, wherein the mobile communication device is located within the ranges of the plurality of wireless access points;
  determining, by an application on the mobile communication device, a country code of at least one beacon of the plurality of beacons detected from the plurality of wireless access points, wherein the country code is associated with a plurality of languages;
  mapping, by the application, the country code of the at least one beacon to a language of the plurality of languages based on the country code of the at least one beacon to determine a language to present on the mobile communication device;
  determining, by the application, a country code of a second beacon of the plurality of beacons;
  mapping, by the application, the country code of the second beacon to one or more languages based on the country code of the second beacon;
  verifying, by the application, based on the country code of the second beacon, the country code of the at least one beacon;
  verifying, by the application, based on the mapping of the country code of the second beacon to the one or more languages, the language associated with the country code of the at least one beacon; and
  presenting an activation screen to a user in the language associated with the country code of the at least one beacon, wherein the activation screen comprises an option for the user to change the language.

8. The method of claim 7, further comprising presenting, when the user chooses to change the language, a second activation screen with one or more language options to a user based on the plurality of languages associated with the country code of the at least one beacon.

9. The method of claim 8, wherein the second activation screen comprises an option for the user to choose another language.

10. The method of claim 9, further comprising presenting, when the user chooses the another language, a third activation screen with a comprehensive list of languages.

11. The method of claim 7, wherein the plurality of languages are ranked by most likely to be spoken by the user.

12. The method of claim 7, further comprising connecting to one of the plurality of wireless points to complete an activation process on the mobile communication device.

13. The method of claim 7, further comprising determining a strongest beacon of the plurality of beacons, wherein the at least one beacon is the strongest beacon.

14. A method for completing an activation process on a mobile communication device comprising a carrier memory partition, the method comprising:
  detecting a plurality of beacons by a short range radio transceiver of the mobile communication device radiated from a plurality of wireless access points;
  determining, by an application on the mobile communication device, a country code of at least one beacon of the plurality of beacons detected from the plurality of wireless access points, wherein the country code is associated with a plurality of languages;
  mapping, by the application, the country code of the at least one beacon to a language of the plurality of languages based on the country code of the at least one beacon to determine a language to present on the mobile communication device;
  determining, by the application, a country code of a second beacon of the plurality of beacons;
  mapping, by the application, the country code of the second beacon to one or more languages based on the country code of the second beacon;
  verifying, by the application, based on the country code of the second beacon, the country code of the at least one beacon;
  verifying, by the application, based on the mapping of the country code of the second beacon to the one or more languages, the language associated with the country code of the at least one beacon;
  presenting an activation screen to a user in the language, wherein the activation screen comprises an option for the user to change the language;
  after the language is chosen, receiving an activation payload in the chosen language;
  completing an activation process on the mobile communication device in the chosen language; and
  writing, by an application programming interface, to the carrier memory partition, instructions for language presentation on the mobile communication device.

15. The method of claim 14, wherein the application is an activation application on the mobile communication device, and wherein the activation application is a part of the application programming interface.

16. The method of claim 14, further comprising presenting language options to the user based on the plurality of languages associated with the country code of the at least one beacon.

17. The method of claim 14, further comprising connecting to one of the plurality of wireless access points to complete the activation process.

* * * * *